US007609407B2

(12) United States Patent
Chinwala et al.

(10) Patent No.: US 7,609,407 B2

(45) Date of Patent: Oct. 27, 2009

(54) THERMAL PRINTING SYSTEM AND METHOD

(76) Inventors: Mukhtar A. Chinwala, 121 Tremont St., Apt. 415, Brighton, MA (US) 02135; Ford R. Ennis, Jr., 51 Shawsheen St., Tewksbury, MA (US) 01876; John L. Landers, 243 Pine Cone Strand, Acton, MA (US) 01718; Arthur G. LaRocque, 64 Bay State Rd., Belmont, MA (US) 02478; Leonid Winestein, 25 Baker Cir., Chestnut Hill, MA (US) 02467

( * ) Notice: Subject to any disclaimer, the term of this patent is extended or adjusted under 35 U.S.C. 154(b) by 905 days.

(21) Appl. No.: 10/867,061

(22) Filed: Jun. 14, 2004

(65) Prior Publication Data

US 2005/0275891 A1 Dec. 15, 2005

(51) Int. Cl.

*G06F 15/00* (2006.01)
*G06K 1/00* (2006.01)
*G06K 15/00* (2006.01)

(52) U.S. Cl. .................................... 358/1.16; 358/1.14

(58) Field of Classification Search ................ 358/1.15, 358/1.13, 1.16, 1.14, 1.18, 1, 1.12; 347/19, 347/14

See application file for complete search history.

(56) References Cited

U.S. PATENT DOCUMENTS

| | | | | |
|---|---|---|---|---|
| 6,374,354 | B1 | 4/2002 | Walmsley et al. | 713/167 |
| 6,375,298 | B2 * | 4/2002 | Purcell et al. | 347/14 |
| 6,386,772 | B1 | 5/2002 | Klinefelter et al. | 400/208 |
| 6,938,976 | B2 * | 9/2005 | Siwinski et al. | 347/19 |
| 7,251,047 | B2 * | 7/2007 | Meade, II | 358/1.13 |
| 2001/0020961 | A1 | 9/2001 | Pauschinger | 347/19 |
| 2003/0038966 | A1 * | 2/2003 | Ishinaga et al. | 358/1.15 |
| 2004/0165211 | A1 * | 8/2004 | Herrmann et al. | 358/1.15 |
| 2005/0200893 | A1 * | 9/2005 | Silverbrook et al. | 358/1.15 |

FOREIGN PATENT DOCUMENTS

| | | | |
|---|---|---|---|
| EP | 0 979 736 | A1 | 2/2000 |
| WO | 98/52762 | A2 | 11/1998 |
| WO | 98/52762 | A3 | 11/1998 |

* cited by examiner

*Primary Examiner*—Douglas Q Tran
(74) *Attorney, Agent, or Firm*—Woodcock Washburn LLP

(57) ABSTRACT

A method and system for authenticating print media includes providing a digital memory physically associated with a holder of print media, and storing data in the digital memory, which data is adapted to be authenticated to allow use of the print media. In a preferred embodiment the system and method are capable of detecting the print medium present in a printer and adjusting printing characteristics of a printer with respect to the specific print medium present.

23 Claims, 4 Drawing Sheets

THERMAL PRINTING SYSTEM AND METHOD

The present invention generally relates to printers for digital photographic images and more particularly to ensuring that the proper print media are used with a manufacturer's printer and adjusting different printing characteristics of the printer for different print media.

BACKGROUND OF THE INVENTION

Printing of digital photographs is proliferating with increased usage of digital cameras and the digital storage and distribution of photographic images. Printing of digital images is somewhat difficult for color images as separate color components are typically applied separately. Further, image quality may vary widely depending upon several factors including the particular print medium being used. Manufacturers can fine tune their printers to produce exceptional quality on given print media, only to have that quality severely degrade when an improper print medium is used.

Because printer sales for each manufacturer are frequently dependent upon the image quality provided, a manufacturer's reputation and sales can suffer when improper print media are used. For this reason, it is desirable for manufacturers to ensure that proper print media are used with their respective printers. It is also desirable that printers have the capability to adjust different printing characteristics depending upon the particular print medium being utilized in any particular instance to obtain improved print quality.

SUMMARY OF THE INVENTION

Accordingly, one embodiment of the present invention provides an authentication system for print media, comprising a digital memory adapted to be physically associated with specific print media, and coded data stored in the memory and being adapted to confirm authenticity of the specific print media.

The coded data stored in the memory may include an identification number, which can be authenticated with an algorithm. The memory may be reprogrammed with a new identification number which is stored in place of the first identification number to enable use of additional print media in association with the memory. The identification number may be unique to the memory.

The system may further comprise a print media holder physically associated with the digital memory, wherein the memory is affixed to the print media holder. The memory may be located in a carrier adapted to be commercially distributed with the print media. The memory may include a copyright notice prohibiting all copying.

The system may further comprise a printer control system adapted to be operably connected to the digital memory and for authenticating the coded data stored in the memory for enabling usage of the print media. The coded data may include an identification number, and the control system may be adapted to store associated usage data as a record of how much print media has been used with respect to the identification number. The digital memory may be a flash memory, and the control system may be adapted to store data in the flash memory responsive to an amount of usage of the print media. The control system may be adapted to terminate usage of print media associated with an identification number once a predetermined amount of print media usage has occurred with respect to the identification number.

In another embodiment, the present invention provides an authentication system for print media, comprising a digital memory adapted to be physically associated with a print media holder, coded data stored in the memory and being adapted to confirm authenticity of the print media holder, and a control system adapted to be operably connected to the digital memory and for authenticating the coded data stored in the memory for enabling usage of print media from the print media holder.

The coded data stored in the memory may include an identification number, and the control system may be adapted for authenticating the identification number with an algorithm.

The control system may be adapted to store the identification number as a record of a print media holder which has been used by the control system. The control system may be adapted to store associated usage data as a record of how much print media has been used with respect to an identification number or a respective print media holder. The digital memory may be a flash memory, and the control system may be adapted to store the usage data in the flash memory. The control system may be adapted to terminate usage of a print media holder associated with an identification number once a predetermined amount of print media usage has been recorded with respect to the identification number. The control system may be adapted to control a printing apparatus.

Yet another embodiment of the present invention provides a method for authenticating print media, comprising the steps of providing a digital memory physically associated with a holder of print media, and storing data in the digital memory, which data is adapted to be authenticated to allow use of the print media. The data in the memory may include an identification number, which is adapted to be authenticated by an algorithm.

The method may further comprise connecting the memory to a printer control system adapted for authenticating the identification number. The method may include digitally storing the identification number as a record of a holder which has been used by the printer control system. The method may also include digitally storing the identification number and associated usage data as a record of how much print media has been used from a respective holder.

The method may still further include terminating usage of the holder once a predetermined amount of print media from the holder has been used.

The digital memory may be a flash memory used for storing data responsive to an amount of usage of print media from the holder.

The method may further include reusing the memory with additional print media or another holder of print media including storing a new identification number in the memory.

In another embodiment of the invention there is provided a method for identifying a particular type of print medium being utilized in a printer and adjusting different characteristics of the printer, such as, for example, the thermal history control, for the particular type of print medium and thereby providing improved image quality with the particular print medium.

In this embodiment, the control system may be adapted to store in the digital memory which, as described above, may be a flash memory, the characteristics for different print media which are supported by the printer. Further, the printer may be configured to print only on specific print media types which are identified in the digital memory.

BRIEF DESCRIPTION OF THE DRAWINGS

For a better understanding of the invention as well as other objects and advantages and further features thereof, reference is made to the following detailed description of various preferred embodiments thereof taken in conjunction with the accompanying drawings wherein.

DETAILED DESCRIPTION OF THE PREFERRED EMBODIMENTS

Figure 1:
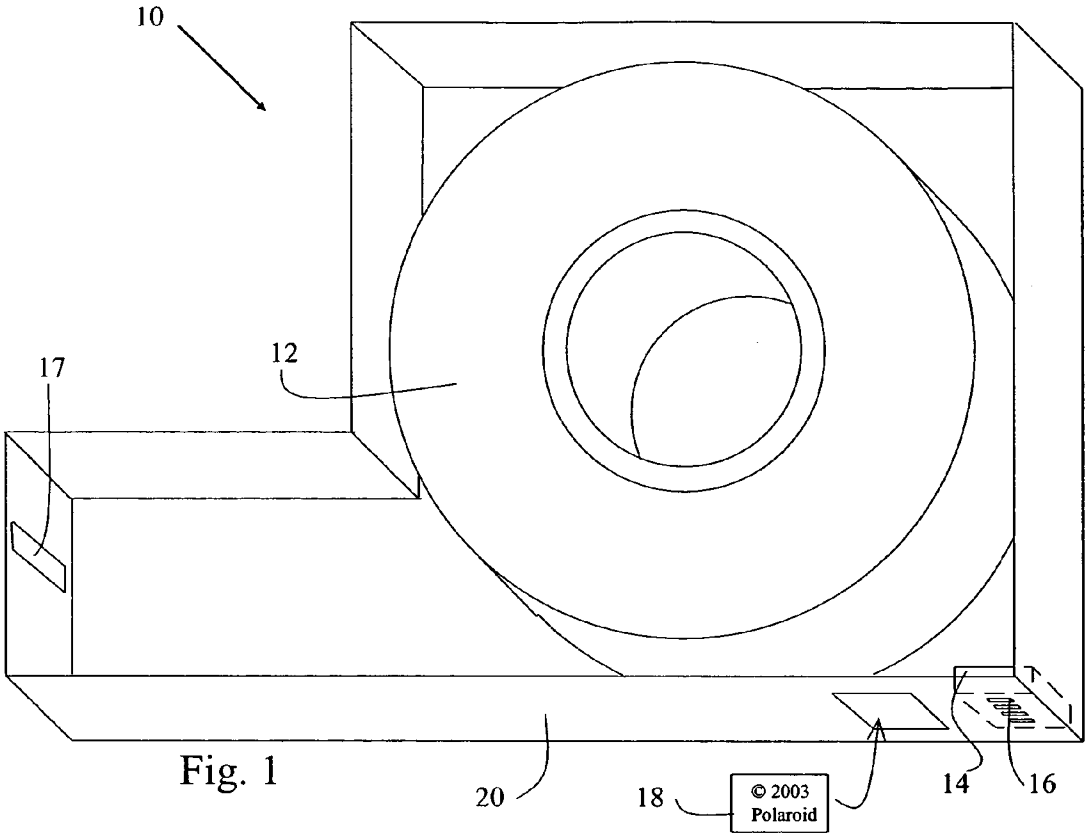
FIG. 1 is a representational perspective view of a print media holder constructed in accordance with the present invention.

FIG. 1 represents a print media cassette or holder 10, which generally includes a roll of a print medium 12 and a digital memory device 14. Digital memory device 14 includes coded data adapted to confirm authenticity of print medium 12 and/or print media holder 10. Print media holder 10 is designed for use with a specially constructed printer apparatus, which couples with the form of holder 10 and electrically connects to memory device 14. Memory device 14 includes electrical contacts 16 adapted to provide access to the data contents of digital memory device 14 by such a specifically constructed printer apparatus. This access enables a printer apparatus, or the control system thereof, to authenticate holder 10 and/or the print medium contained therein. Print medium 12 would be fed to a printer through an opening 17 in holder 10.

Digital memory device 14 further includes a copyright notice 18 appearing on a visible outside surface 20. Copyright notice 18 serves as a reminder to would-be copiers that copying the contents of memory device 14 is illegal.

Figure 2:
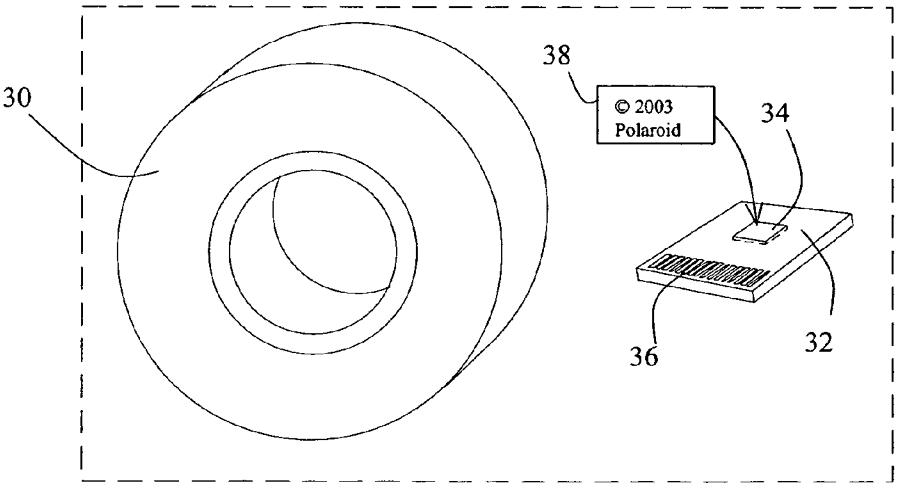
FIG. 2 is a representational perspective view of a roll of print media associated with a flash memory in accordance with another embodiment of the present invention.

FIG. 2 shows a roll of a print medium 30 in association with a memory device carrier 32. Carrier 32 includes a memory device 34, which may take any suitable form such as a flash memory. Memory carrier 32 also includes a multiplicity of electrical contacts 36 allowing external access to memory device 34 and its contents. Memory device carrier 32 would also include a copyright notice 38 to discourage unauthorized access to the data contents of memory device 34.

In a preferred embodiment, memory device 34 takes the form of a smart card, such as the one available from Datacard Group of Minnetonka, Minn. The smart card includes a flash memory and control intelligence which only allows access to the contents of the memory in response to a predetermined password. This type of memory device provides enhanced security to the contents of the memory and its uses. This type of memory device may also be used in place of memory device 14 of FIG. 1.

Although the more secure smart card is identified as a preferred embodiment, other, less physically secure types of memory devices, may also be used. Although such devices may be physically less secure, they typically contain significantly larger amounts of memory, which may be used to encode their data thus enhancing security. Other examples of usable memory devices could include an industry standard flash memory device, such as SECURE MEDIA, MEMORY STICKS, magnetic strips or an optical memory surface such as that used for compact disks. The authentication function for data contained in such open memory devices might then reside in software, i.e., printer driver, running on a standard personal computer, or PC, used to drive a printer apparatus.

Figure 3:
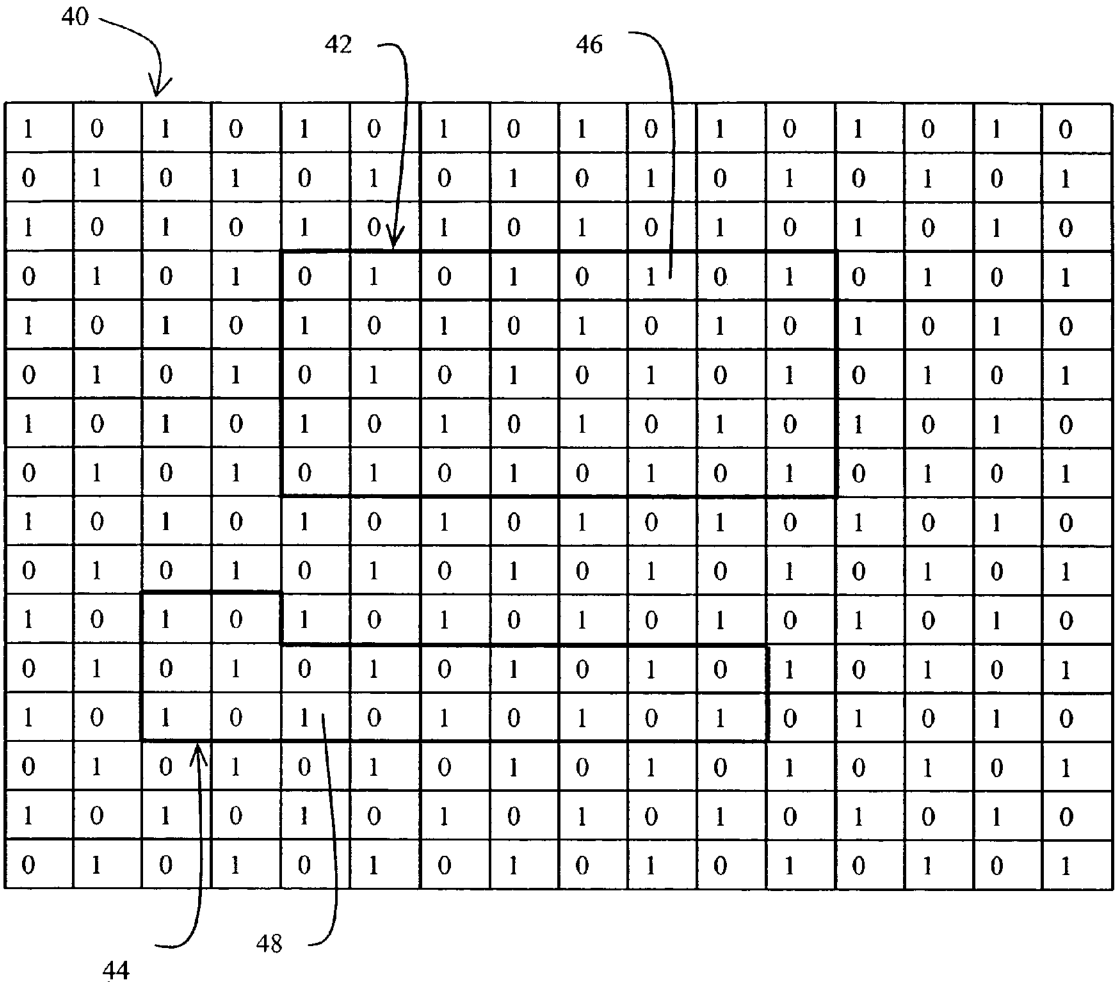
FIG. 3 is a tabular representation of a digital memory used in accordance with the present invention.

FIG. 3 is a tabular representation of data stored in a memory device for purposes of the present invention. The intersection of rows and columns may represent either individual data bits, bytes, or larger numbers. In the smart card embodiment mentioned above, the memory includes 256 bytes. Data within memory 40 may be encoded by any suitable means, such as by non-linear memory locations 42, 44.

The contents of memory 40 preferably include an identification number 46, in memory location 42. Memory 40 may further include usage data 48 stored in memory location 44. This usage data is described in greater detail below.

Identification number 46 may include encoding in the form of amenability to an algorithm. Thus, for each memory device, only certain numbers out of the entire available series would be used. The numbers used would cause the application of the algorithm to produce an identifiable result. The limitation of using less than all of the available numbers in a series is compensated for by using a sufficiently large series, which is possible due to the available sizes of modern flash memories. The algorithm may contain any suitable combination of mathematical or non-mathematical operations. An example of one simplified algorithm is verification of the identification number 46 in a look-up table.

The various specific encoding and authentication techniques described herein are presented as an example and various suitable techniques may be alternatively or additionally used.

Figure 4:
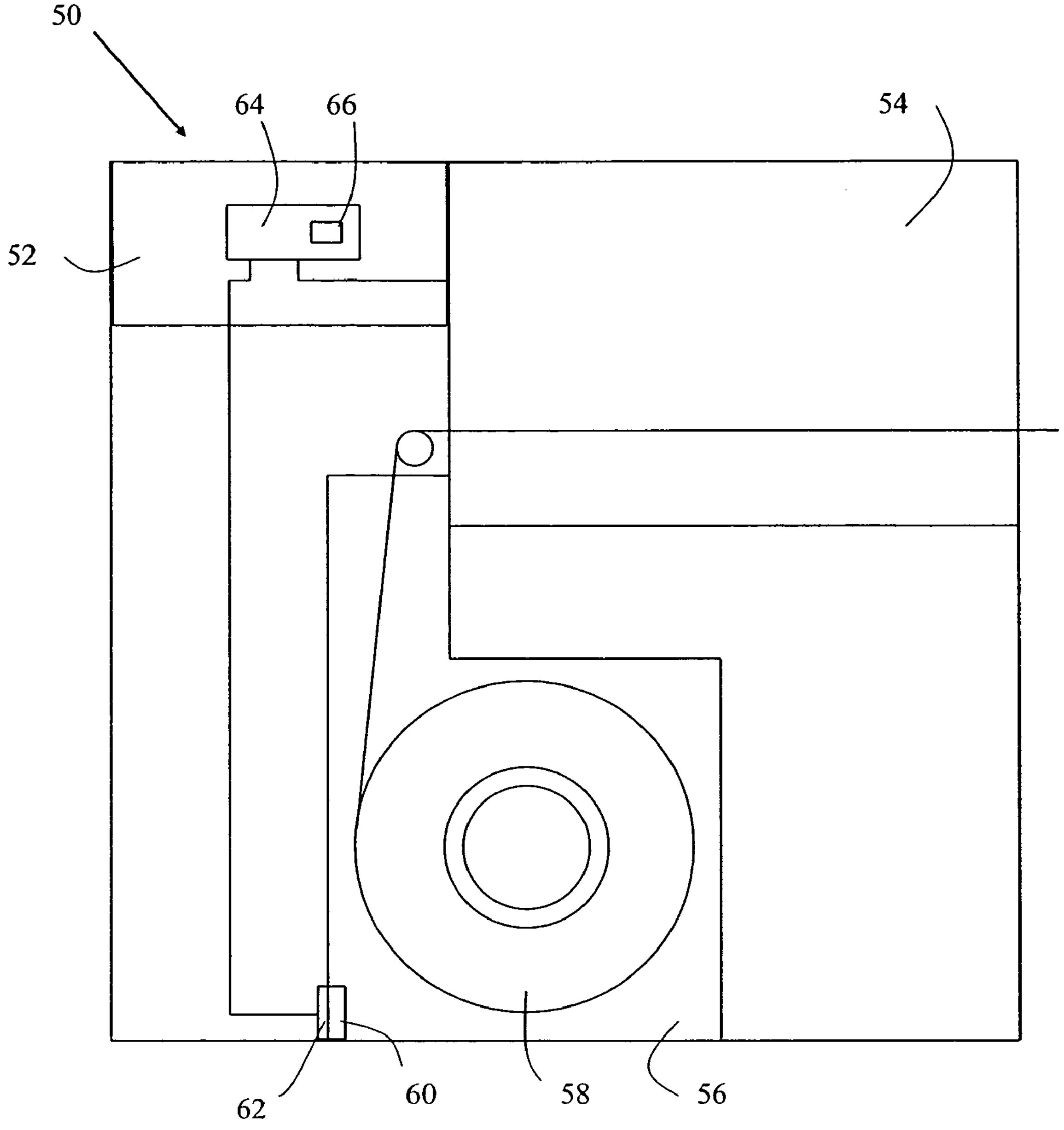
FIG. 4 is a representational side view of a printer apparatus constructed in accordance with yet another embodiment of the present invention.

FIG. 4 shows a representational side view of a printer apparatus 50, which generally includes a control module 52, a printing mechanism 54 and a print media holder 56. Print media holder 56 is constructed in the same form as print media holder 10 of FIG. 1, and includes a roll of a print medium 58, which is threaded through printer mechanism 54. Print media holder 56 also includes memory module 60 which is coupled to control module 52 through a connector 62. Printer apparatus 50 is constructed specifically to accept print media holder 56 and includes a control system 64 located in module 52, which control system is adapted to access data within memory device 60. The data in memory device 60 includes the same identification number discussed in reference to FIG. 3 and control system 64 is adapted to authenticate identification numbers within memory device 60 with the use of a look-up table 66 and to responsively enable printing on print medium 58.

In practice, when a print media holder 56 is installed into printer apparatus 50, control system 64 reads and authenticates the identification number stored in memory 60. Upon such authentication, printer apparatus 50 is enabled by control system 64 to allow printing. Control system 64 also stores the authenticated identification number in an internal memory as a record of an authentication number that was used with printer apparatus 50. Thus, if another print media holder having the same identification number is installed in printer apparatus 50, its use can be disabled as a counterfeit print media holder.

Control system 64 also keeps track of the amount of print media usage associated with each identification number and likewise stores that usage data in an internal memory. Thus, if the usage level exceeds the amount of usage available from a single print media holder, usage of print media associated with the corresponding identification number can be blocked. It may also be the case that a print media holder 56 is prematurely removed from apparatus 50 and is then reinstalled. Even though control system 64 recognizes the identification number as one that has already been used, further usage can be allowed based upon the known usage level for that holder.

Control system 64 may further be adapted to store the usage data in memory device 60, such as usage data 48 in memory location 44 (FIG. 3). This enables a print media holder 56 to be removed from printer apparatus 50 and properly installed and used in a similarly compatible printer apparatus (not shown). Other forms of data may also be recorded in memory device 60 to prevent different forms of unauthorized usage.

In addition to identification of the media as proper for use in a printer apparatus, the present arrangement may also be used to further enhance print quality by using the memory device to store print media calibration data. In this manner, a suitably programmed printer could fine tune its printing process to a particular batch of a specific type of a print medium or to one or more specific types of print media which are incorporated in the printer memory.

Figure 5:
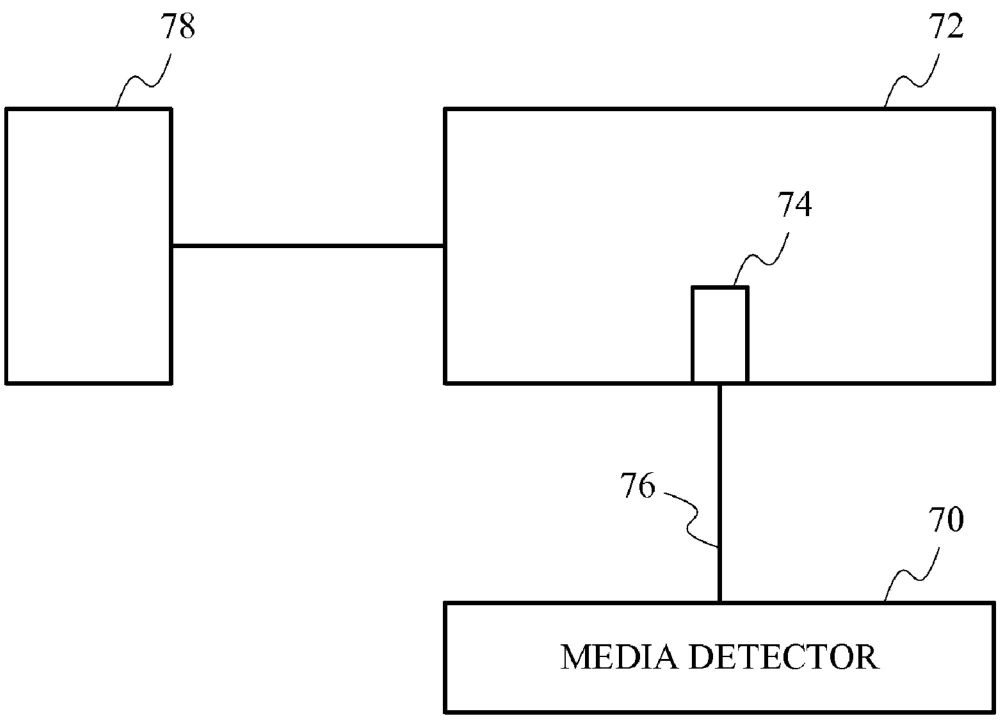
FIG. 5 is a block diagram illustrating the operation of one embodiment of the present invention.

Referring now to FIG. 5 there is seen a block diagram illustrating another preferred embodiment of the invention. This embodiment includes an electronic print media detection element 70 for identifying the particular type of print medium which has been inserted in the printer apparatus 72. Detection element 70 is coupled to memory module 74 of printer 72 through a connector 76.

The memory module 74 includes data identifying various types of print media which have been selected as being preferred for use with the printer 72. In one embodiment the printer may be configured not to print on any print medium for which identifying data is not included in memory module 74. In another embodiment, the printer may be configured to adjust various printing characteristics so as to optimize the print quality of the images printed on the specific print medium being used in a particular instance. Generally, according to this embodiment it is possible to achieve WYSWYG ("what you see is what you get") by matching more closely in the image formed the color characteristics of the image being copied. Print characteristics which may be adjusted include, for example, thermal history control, color profiles for the print media, look up tables (LUTS) and the like.

Memory module 74 may contain any of the memory devices described previously herein. The printer adjustment function for data contained in open memory devices might then reside in software, i.e., printer driver, running on an image input device such as a standard personal computer, or PC, 78 used to drive printer apparatus 72 or the software may be stored in memory module 74. The resulting printer-specific bitmap is converted to signals which are sent to one or more print head(s) (not shown) of printer 72.

Although the present invention has been described illustratively above with respect to various preferred embodiments, those skilled in the art will recognize that various modifications and changes may be made to the disclosed embodiments without departing from the scope of the present invention as defined in the appended claims.

What is claimed is:

1. An authentication system for print media, comprising:

a digital memory adapted to be physically associated with a print media holder;

coded data stored in said memory and being adapted to confirm authenticity of said print media holder; and a control system adapted to be operably connected to said digital memory and adapted for authenticating said coded data stored in said memory for enabling usage of print media from said print media holder.

2. The system of claim 1, wherein said coded data stored in said memory includes an identification number, and further wherein said control system is adapted for authenticating said identification number with an algorithm.

3. The system of claim 2, wherein said control system is adapted to store said identification number as a record of a print media holder which has been used by said control system.

4. The system of claim 2, wherein said control system is adapted to store associated usage data as a record of how much print media has been used with respect to an identification number or a respective print media holder.

5. The system of claim 4, wherein said digital memory is a flash memory, and further wherein said control system is adapted to store said usage data in said flash memory.

6. The system of claim 4, wherein said control system is adapted to terminate usage of a print media holder associated with an identification number once a predetermined amount of print media usage has been recorded with respect to said identification number.

7. The system of claim 1 and further wherein said control system is adapted to store characteristics of a plurality of print media in said memory.

8. A method for authenticating print media in a printer, wherein said printer comprises a holder of said print media and a digital memory physically associated with said holder, the method comprising:

storing data in said digital memory, which data is adapted to be authenticated to allow use of said print media; and reading said stored data to confirm the authenticity of said holder.

9. The method of claim 8, wherein said data in said memory includes an identification number, which is adapted to be authenticated by an algorithm.

10. The method of claim 9, further comprising connecting said memory to a printer control system adapted for authenticating said identification number.

11. The method of claim 10, further comprising digitally storing said identification number as a record of a holder which has been used by said printer control system.

12. The method of claim 10, further comprising digitally storing said identification number and associated usage data as a record of how much print media has been used from a respective holder.

13. The method of claim 12, further comprising terminating usage of said holder once a predetermined amount of print media from said holder has been used.

14. The method of claim 8, further comprising reusing said memory with additional print media or another holder of print media including storing a new identification number in said memory.

15. The method of claim 10 and further wherein said control system is adapted to store characteristics of a plurality of print media in said memory.

16. A authentication system for authenticating print media in a printer, wherein said printer comprises a holder of said print media and a digital memory physically associated with said holder, the system comprising:

means for storing data in said digital memory, which data is adapted to be authenticated to allow use of said print media; and means for reading said stored data to confirm the authenticity of said holder.

17. The system of claim 16, wherein said data in said memory includes an identification number, which is adapted to be authenticated by an algorithm.

18. The system of claim 17, further comprising:

means for connecting said memory to a printer control system adapted for authenticating said identification number.

19. The system of claim 18, further comprising:

means for digitally storing said identification number as a record of a holder which has been used by said printer control system.

20. The system of claim 18, further comprising:

means for digitally storing said identification number and associated usage data as a record of how much print media has been used from a respective holder.

21. The system of claim 20, further comprising:

means for terminating usage of said holder once a predetermined amount of print media from said holder has been used.

22. The system of claim 16, further comprising:

means for reusing said memory with additional print media or another holder of print media including storing a new identification number in said memory.

23. The system of claim 18, wherein said control system is adapted to store characteristics of a plurality of print media in said memory.

* * * * *

UNITED STATES PATENT AND TRADEMARK OFFICE

CERTIFICATE OF CORRECTION

PATENT NO. : 7,609,407 B2
APPLICATION NO. : 10/867061
DATED : October 27, 2009
INVENTOR(S) : Chinwala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1535 days.

Signed and Sealed this

Twelfth Day of October, 2010

David J. Kappos

*Director of the United States Patent and Trademark Office*